Figure 1:
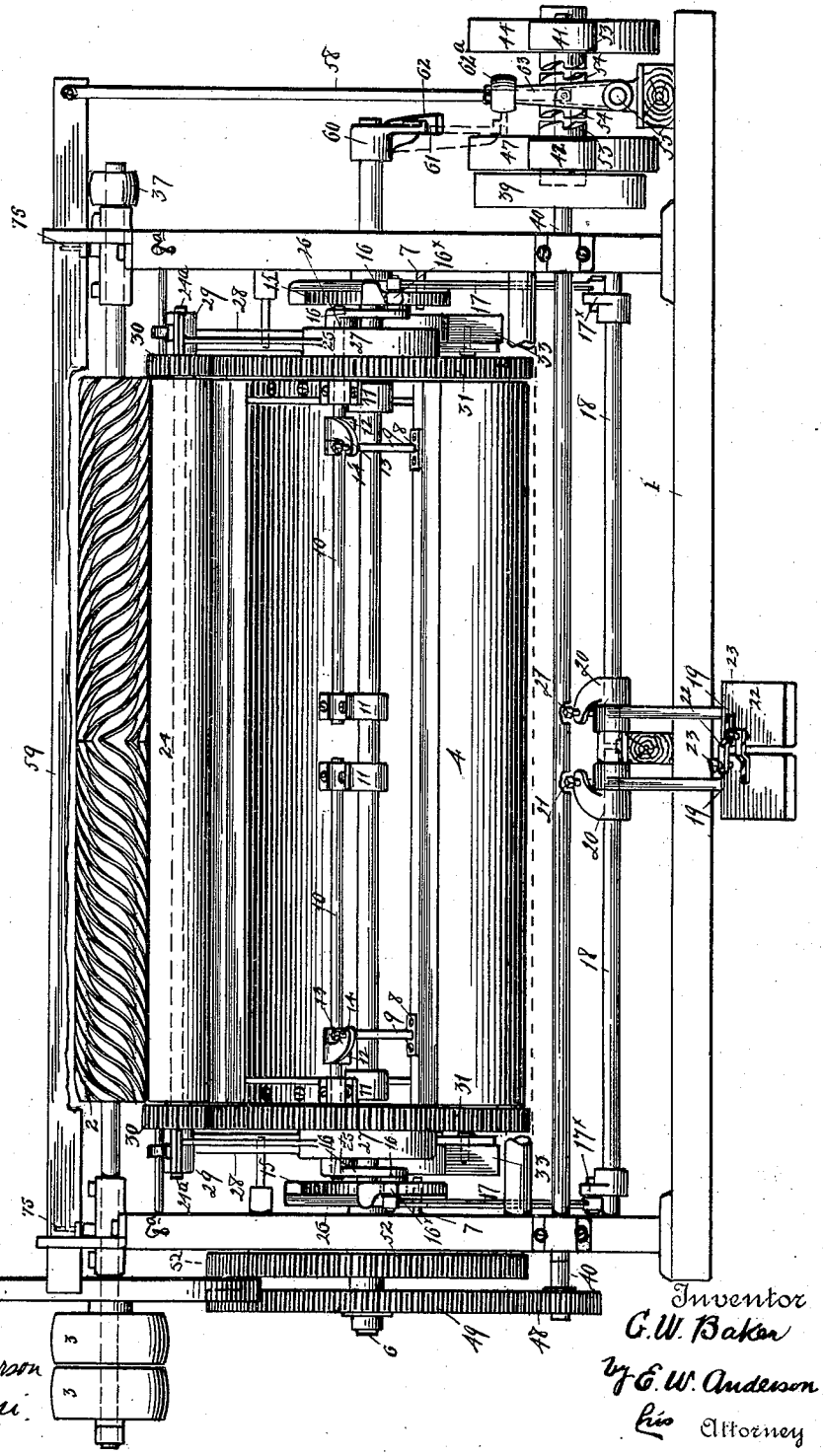

(No Model.) 4 Sheets—Sheet 1.

G. W. BAKER.
HIDE AND LEATHER WORKING MACHINE.

No. 578,309. Patented Mar. 9, 1897.

Witnesses
Geo. M. Anderson
Phil C. Masi

Inventor
G. W. Baker
by E. W. Anderson
his Attorney (No Model.) 4 Sheets—Sheet 2.
G. W. BAKER.
HIDE AND LEATHER WORKING MACHINE.
No. 578,309. Patented Mar. 9, 1897.
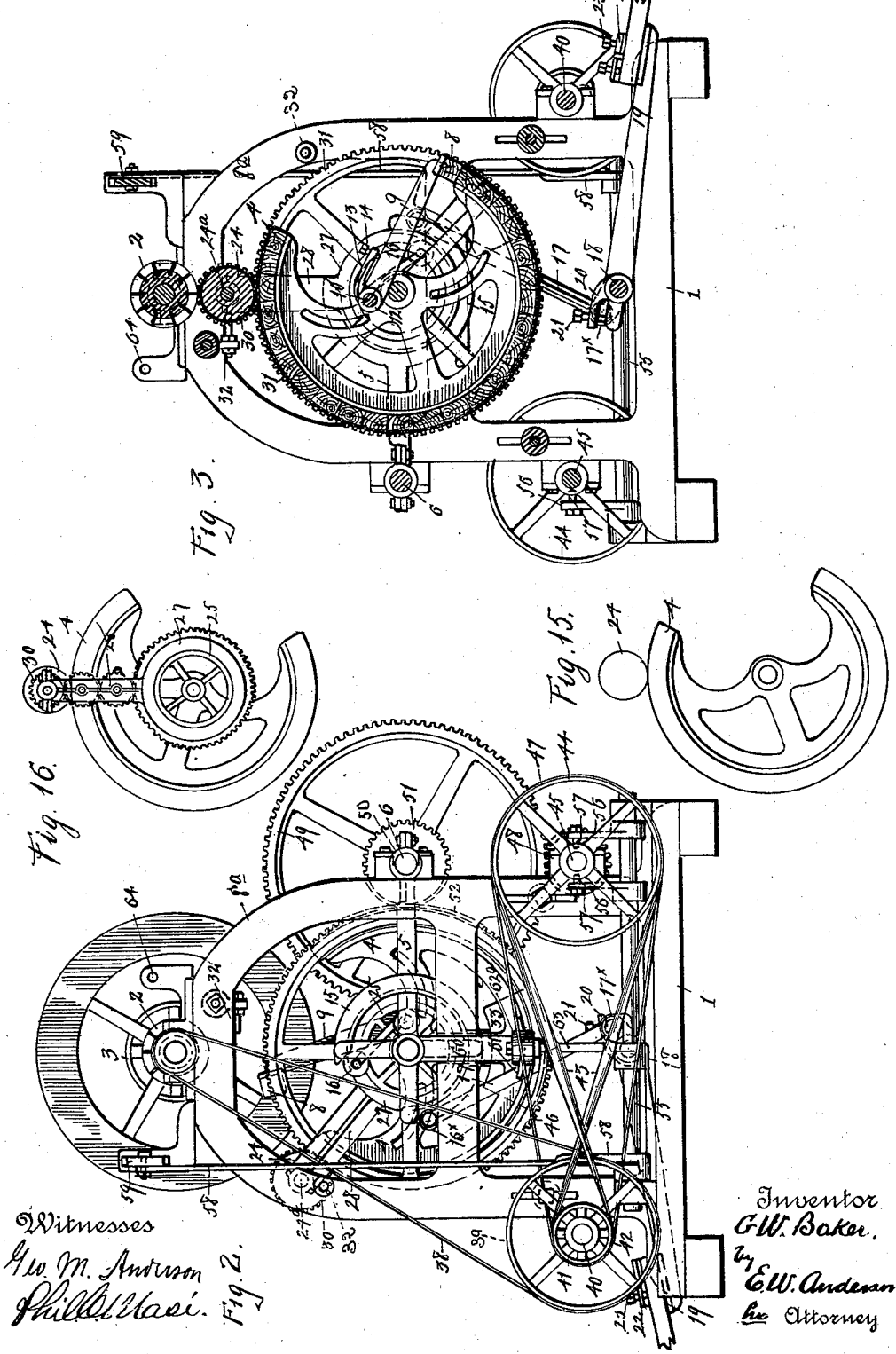

(No Model.) 4 Sheets—Sheet 3.
G. W. BAKER.
HIDE AND LEATHER WORKING MACHINE.
No. 578,309. Patented Mar. 9, 1897.
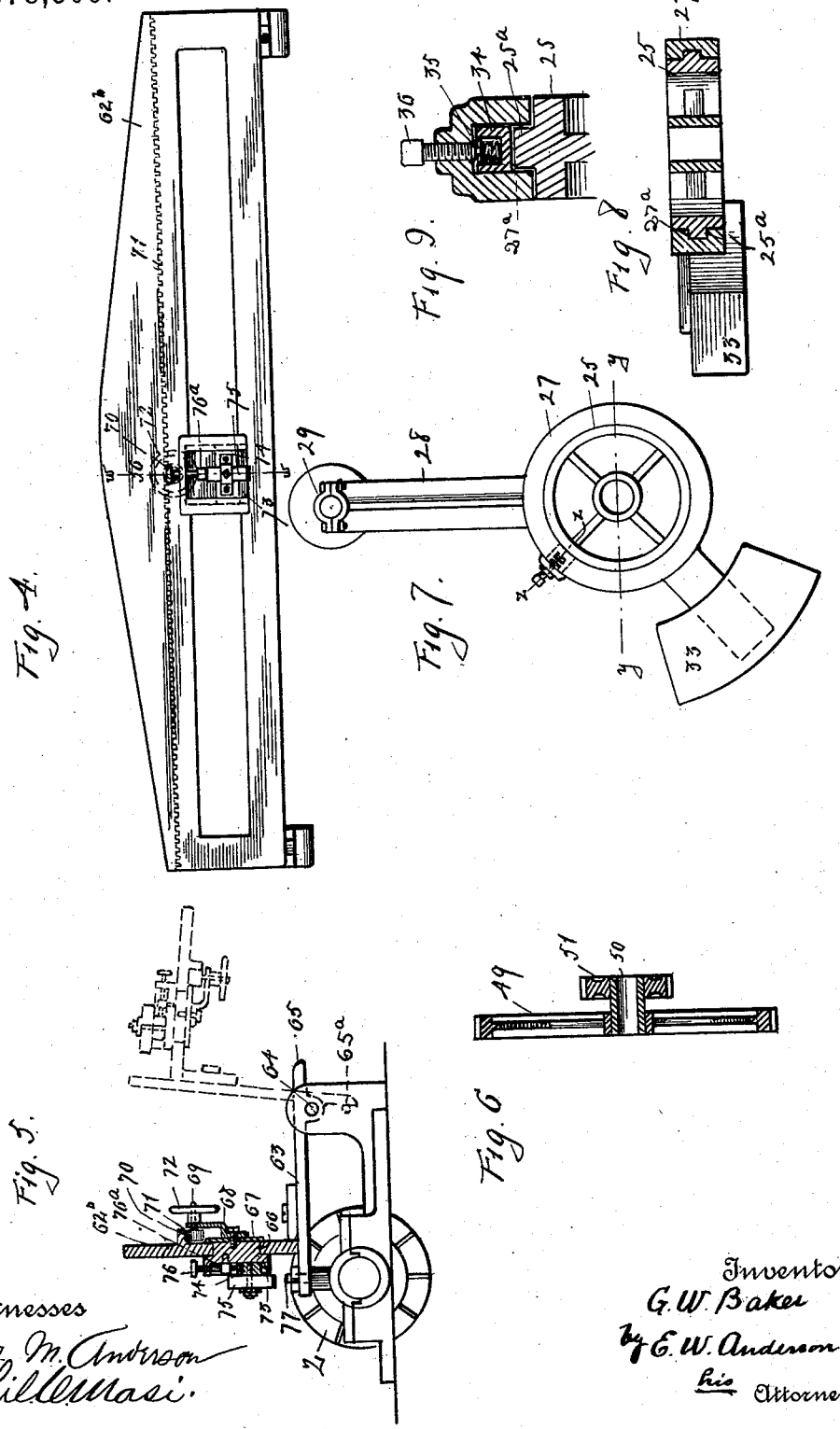

(No Model.) 4 Sheets—Sheet 4.
G. W. BAKER.
HIDE AND LEATHER WORKING MACHINE.
No. 578,309. Patented Mar. 9, 1897.
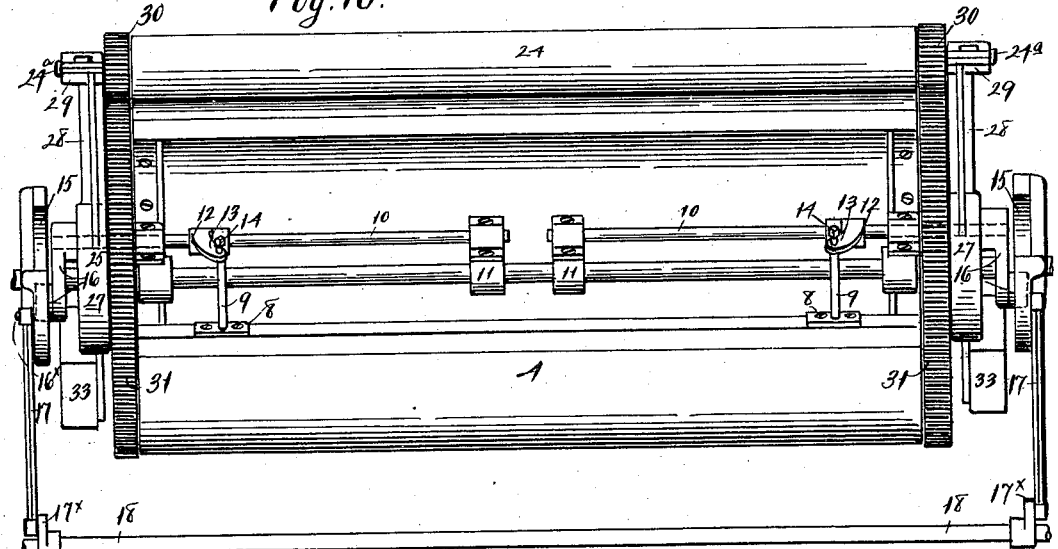
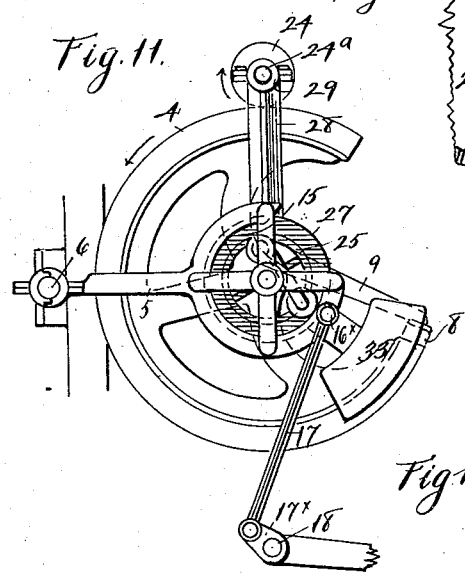
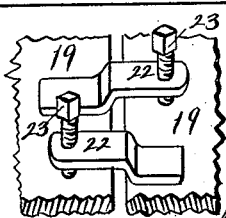
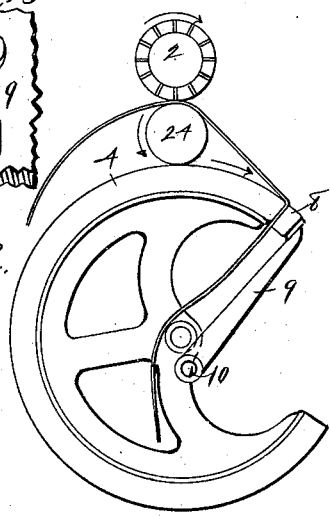
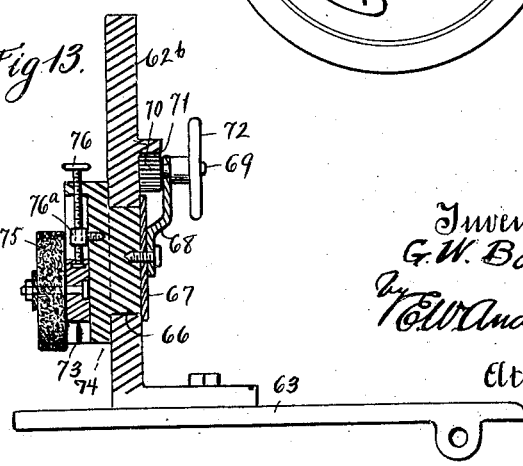
Witnesses
G. M. Anderson
Phil C. Mas.
Inventor
G. W. Baker
by C. W. Anderson
Attorney

UNITED STATES PATENT OFFICE.

GEORGE W. BAKER, OF WILMINGTON, DELAWARE.

HIDE AND LEATHER WORKING MACHINE.

SPECIFICATION forming part of Letters Patent No. 578,309, dated March 9, 1897.

Application filed March 5, 1896. Serial No. 581,948. (No model.)

*To all whom it may concern:*

Be it known that I, GEORGE W. BAKER, a citizen of the United States, and a resident of Wilmington, in the county of New Castle and State of Delaware, have invented certain new and useful Improvements in Hide and Leather Working Machines; and I do declare the following to be a full, clear, and exact description of the invention, such as will enable others skilled in the art to which it appertains to make and use the same, reference being had to the accompanying drawings, and to figures of reference marked thereon, which form a part of this specification.

Figure 1 is a front view of machine embodying the invention, clutch 54 disconnected, and parts in the positions shown in Fig. 3. Fig. 2 is an end view from the right of machine with parts in the proper positions for starting the operation. Fig. 3 is a section on the line $x$ $x$, Fig. 1, clamp in engagement, table-cylinder in operating position, and drum rotated about ninety degrees. Fig. 4 is a front view of sharpening mechanism disconnected from machine. Fig. 5 is a section on line $w$ $w$, Fig. 4, with the device shown in operating relation to machine, its position when thrown back being indicated in dotted lines. Fig. 6 is a sectional view of spur-wheel 49 and its attached pinion. Fig. 7 is a detail side view of one of the two devices for supporting and controlling the table-cylinder. Fig. 8 is a section on line $y$ $y$, Fig. 7. Fig. 9 is an enlarged section on line $z$ $z$, Fig. 7. Fig. 10 is a front view showing the large drum, the cylinder-table, and their adjuncts removed from the frame. Fig. 11 is an end view of the same, looking in the same direction as in Fig. 3. Fig. 12 is an end view of the large cylinder, the cylinder-table, and the tool-cylinder, looking in the same direction as in Fig. 2 and showing the manner in which the hide is held and operated upon. Fig. 13 is a sectional view of the grinding attachment detached. Fig. 14 is a fragmentary perspective view showing the adjustable treadle-stops, and Figs. 15 and 16 are detail views showing different means for driving the cylinder-table.

This invention relates to machines of that class used in beam-houses and currying-shops in the manufacture of hides and skins into finished leather, to flesh, unhair, work out, set out, skive, buff, and do other lines of work of like nature. Machines of this class now in use employ largely a rotary or oscillating cylindrical or segmental drum-table upon which the material is worked by the tool. With such machines, however, there has been experienced a serious difficulty or objection—viz., the tendency of the lower side of the hide or skin to stick or adhere to the drum-table, due to the friction of said table, the pressure of the tool opposed thereto, and to atmospheric pressure resulting from the exhaustion of the air from beneath the material. This sticking or adhering of the material to the drum-table not only causes difficulty and delay in removing it from or shifting it upon the table, but it also results in an unequal stretching of the material, the lower or inner portions thereof being unable to move or slip under the action of the tool to the same extent as the upper or outer portions.

The object of this invention is therefore, mainly, to overcome this objection and to give a continuous working surface to both sides of the material to be treated.

Other objects of the invention relate to the improvement of the machine as a whole, and will hereinafter fully appear.

With these objects in view the invention consists in the novel construction and combination of parts, all as hereinafter described, and pointed out in the appended claims.

Referring to the accompanying drawings, the numeral 1 designates the frame of the machine.

2 is the helical tool-cylinder, journaled longitudinally at the upper portion thereof in the usual manner and having on its shaft the fast and loose pulleys 3. Said tool may be of any suitable character, such, for instance, as that shown in my Patent No. 538,944, dated May 7, 1895.

4 designates the large rotary drum, which is journaled below the tool and has a segment removed from its periphery, as indicated. The shaft of said drum has its bearings in and is supported by the arms 5, one near each end of the machine, said arms being pivotally hung upon a non-rotary longitudinal shaft 6 behind the drum-shaft. This arrangement permits the drum to be raised and lowered to bring the work to or away from the tool in the manner more fully hereinafter described.

7 indicates stops carried by the end bars 8ᵃ of the frame for engagement with the said arms to limit the descent of the drum.

8 designates the work-clamp, which is in general the same as that described in my Patent No. 512,088, dated January 2, 1894, but which I have, however, in some respects improved upon. Said clamps are carried by arms 9, which are loosely sleeved upon the shaft or shafts 10, which are journaled in bearings 11, keyed to the drum-shaft. In the present instance I have shown the shaft 10 as being in two sections to permit the parts to be more readily assembled in the construction of the machine. Keyed to each of said shafts adjacent to its arm 9 is a sleeve or collar 12, provided with an arm 13, which projects over the arm 9 and carries a set-screw 14 for engagement with said arm. From this arrangement it will be readily seen that the adjustment of the screw 14 will control the bite of the clamp upon the work.

15 are the open cam-rings, and 16 the cranks, studs, and rollers carried by the shafts 10, the rollers traveling upon the inner peripheries of the said cam-rings to automatically operate the clamp, all as in the said Patent No. 512,088. Said cam-rings are carried by the arms 5, in which the drum-shaft has its bearings, and connected to lugs 16 thereof are the downwardly and forwardly extending arms 17, which at their lower ends are connected to short arms 17, secured to the treadle-shaft 18. Said treadle-shaft is made in two independent sections, each of which carries its own treadle-lever and treadle 19. Said treadle-levers are each loosely sleeved upon its shaft, and its connection therewith is made by means of an arm 20, keyed to the shaft and having an adjustable screw 21 for engagement with the treadle-lever. This arrangement is the same as in the said patent and is for the purpose of permitting the two ends of the drum to be unequally raised, which is necessary in operating upon material different portions of which vary in thickness, as in fleshing sides of skins the back portions of which are always thicker than the bellies.

In addition to this feature I have provided each treadle with an adjustable stop 22, which consists of a strap attached thereto and extending transversely over the adjacent treadle, its free end carrying an adjusting-screw 23. By varying the extension of these screws either treadle may be permitted to descend a given distance before the screw of its stop makes contact with the adjacent treadle, after which both treadles will descend together, or the screws may be so adjusted as to cause both treadles to descend uniformly together. In this manner it will be observed that the operation of the treadles and the resulting movement of the drum may be accurately controlled. As was stated at the outset, this drum 4 in previous machines has constituted the working-table of the machine, the material being placed thereon and operated upon directly by the helical tool. In the present machine this drum is simply a winding or pulling drum, the work being performed upon a smaller cylinder 24, (hereinafter termed the "cylinder-table,") placed intermediately of said drum and the tool, and it is in this feature, now to be described, that the main improvement consists.

Keyed to the drum-shaft just inside of each of the cam-rings 15 is a large sleeve or bearing 25, through which, as indicated at 26, the clamp-shaft 10 passes. Placed around each of said sleeves or bearings and arranged to oscillate thereon is a strap 27, having an upwardly-projecting arm 28. Formed at the upper end portion of each of said arms is a boss or bearing 29, in which is journaled the shaft 24ᵃ of the cylinder-table 24, above referred to. Upon each end portion of said shaft, just inside the arm 28, is keyed a pinion 30, which meshes with a large spur-wheel 31, keyed on the drum-shaft. This cylinder-table 24 has a double movement, *i. e.*, a rotary movement due to the pinions 30 and spur-wheels 31 and an oscillatory movement above the upper portion of the drum on the arc of a circle whose radius is equal to the distance from center of shaft 24ᵃ to the center of the drum-shaft, suitable stops 32 on the frame limiting its movement in each direction. The normal position of said cylinder-table when not in use is shown in Fig. 2, being lowered away from the helical cylinder. Its working position is shown in Fig. 3 and is directly underneath, or it may be below and a little in front of, the said tool-cylinder. The straps 27 have counterweighted arms 33, which nearly counterbalance the cylinder-table 24, their gravity being such as to return said table to its position of rest (shown in full lines, Fig. 2) as soon as an operation is completed. While the straps 27 rotate upon the bearings 25 with sufficient freedom to permit this return movement, it is necessary to provide sufficient friction between them to cause the arms 28 to revolve to bring said cylinder-table into working position when the drum 4 is again thrown into operation. For this purpose each of the said straps is cored out at one side to receive a friction-block 34, of wood or other suitable material, and which contacts with the bearing 25. In order to regulate this contact and the amount of friction resulting therefrom, a spring 35 is seated upon the outer surface of the said block, and upon this spring is seated a washer acted upon by a screw 36.

The bearings 25 are shown as having each a circumferential rib 25ᵃ, which engages a corresponding groove 27ᵃ to prevent lateral movement of the said strap. This, however, may be accomplished in various ways.

It is obvious that in place of the particular friction device just described any other suitable device known to the mechanic may be employed.

The drum 4 has a reciprocating or forward-and-back motion derived from gearing arranged as follows: On the shaft of the helical tool 2 is a small pulley 37, which is connected by a belt 38 to a large pulley 39, keyed to a shaft 40, journaled at the lower forward portion of the machine. On said shaft are two small pulleys 41 42, the pulley 41 being crossbelted (belt 43) to a larger pulley 44, loosely mounted on a shaft 45 at the lower rear portion of the machine, while the pulley 42 is open-belted (belt 46) to a second loose pulley 47, also on the shaft 45. Said shaft 45 has a spur-pinion 48 keyed thereto, which meshes with a large spur-wheel 49, loosely mounted on the non-rotary shaft 6, before referred to. On the sleeve-hub 50 of said spur-wheel is a pinion 51, which meshes with a large spur-wheel 52 on the drum-shaft. Each of the pulleys 44 47 has a clutch-hub 53, which is adapted to engage with a clutch 54, having a sliding engagement with the shaft 45. At the lower right-hand portion of the machine is a short transverse rock-shaft 55, having an arm 56, carrying pins 57, which engage the clutch 54 in such a manner that as the said shaft 55 is rocked said clutch will be moved endwise on the shaft 43 into or out of engagement with the clutch-hubs of either pulley 44 47, as may be desired.

58 is a lever-arm connected to the rock-shaft 55, and 59 is a shift-bar connected to said lever and movable in suitable bearings at the upper forward portion of the machine, within convenient reach of the operator, whereby he can control the gear to give either a forward or backward movement to the drum 4.

The arrangement of gearing is such, it will be observed, that while the helical tool 2 will have a rapid rotation, say of fourteen hundred revolutions per minute, the drum 4 will have a slow movement, (about six revolutions per minute,) also that the table-cylinder 24 will make about five revolutions to one of the drum. I do not, however, confine myself to any particular relative size of the gears which drive the said cylinder 24, which may be geared to make only part of a revolution, or the arrangement of such gears. I may, for instance, instead of the large spur-wheels and pinions, employ trains of small gears journaled to studs on the arms 28, as shown in Fig. 15, or it may be turned in the same manner by friction if resting upon winding-drum, as shown in Fig. 16. This manner of driving is not, however, as reliable as that first described. The shaft of drum 4 is extended at the right-hand end of the machine and is fitted with an arm 60, having at its free end a shoe 61, formed with a cam edge 62, designed to engage with a roller 62ª, journaled upon the upper end of an arm 63, which is keyed to the rock-shaft 55. The purpose of this device is to automatically stop the drum, after it has made a revolution or partial revolution, upon its return, with the edge of its cut-away portion substantially in line with the table-cylinder 24. This it accomplishes by the operation of the said rock-shaft to move the clutch 54 out of engagement with the rearward-driving pulley on the shaft 45 into a position midway between the said pulleys.

The operation of the machine is as follows: The belts being on and the table-cylinder 24 resting against the lower stops therefor, with the forward edge of the winding-drum 4 returned into line with it and the clamp wide open, the work to be treated is thrown over the edge of the drum and also over the cylinder 24, (see Fig. 12,) the part not to be treated lying within the opening thereof. The operator next moves the shifting-bar to throw into gear the clutch for the forward revolution of the drum, and the drum, cylinder-table, and work all move forward until the table-cylinder is brought to a stop under the rapidly-revolving tool-cylinder 2, with the work passing between said cylinders. During this movement the operator has, by the operation of the treadles, raised the drum, and with it the table-cylinder and work, into proper relation to the tool-cylinder, and the clamp has closed upon the work. The operation proper now commences, the drum pulling away the work behind the tool-cylinder, which is acting upon the upper side of the work, while the table-cylinder is turning in the opposite direction underneath it. Thus both sides of the work are acted upon by forces tending to stretch them equally. Inasmuch as the surface of the said table-cylinder is constantly changing to the work, which is also pulled away from it by the drum, it is impossible for it to adhere or stick to said cylinder. This cylinder being of small diameter, there is a less area of contact between it and the tool-cylinder, whereby the work is done both easier and better. This is especially the case in fleshing with what is known as a "square-edged" knife, inasmuch as the clearance with a cylinder of six inches in diameter is five times as great as with a cylinder of thirty inches diameter. That is to say, the area of crowning surface opposed to the knives is greatly decreased, whereby there is less resistance to the passage of the knives. After one-half of the material is worked the operator reverses the machine, when the table-cylinder is instantly carried back to its position of rest, where it remains until the drum and clamp return to their original position, where they are automatically stopped by the means above described. The material is then reversed, and the operation is repeated.

It must be noticed that the space between the table-cylinder when in its position of rest and the working or tool cylinder is only just sufficient to conveniently permit the feeding of the machine. The advantage gained by this is the shorter time required to treat small portions of the hides or skins, such as the shanks, as the operator can reverse the machine as soon as the work is completed instead of permitting the drum to make an entire revolution. That is to say, there is less lost motion than would be the case if the said cylinder was required to move through a considerable arc in coming to or leaving the work. Said cylinder-table is usually covered with leather or with vulcanized rubber.

Inasmuch as the knives of the tool-cylinder need frequent grinding, it becomes very desirable to have the machine provided with an attachment for this purpose. In my Patent No. 497,941, dated May 23, 1893, I have shown an attachment of this nature. I have now improved such attachment somewhat and will now proceed to describe the same.

62$^b$ designates an edgewise-disposed longitudinally-slotted frame located over and a little behind the center of the tool-cylinder 2. This frame is carried by arms 63, one at each end portion, which are hinged or pivoted to the upper rear portion or frame 1 at 64, said arms having the projections 65 behind the pivotal points, which engage with projections 65$^a$ of the frame to form stops for supporting the attachment when swung backward out of use. Seated in the slot of said frame, which forms a guideway, is a slide 66, having a back plate 67, to which is attached a bracket-arm 68. Journaled in said arm is a shaft 69, carrying a pinion 70, which runs in a rack 71 on the upper rear portion of frame 62. 72 is a hand-wheel on said shaft. On the front face of the said slide 66 is a vertical guideway 73, in which is a sliding block 74, to which is secured an emery block 75.

76 is an adjusting-screw for block 74, and 76$^a$ is a stationary nut on the slide 66, in which said screw has a bearing.

77 are vertical screws on the main frame 1, which engage the arms 63 and support the attachment in proper relation to the tool-cylinder.

The screw 76 and sliding block provide means for adjusting the emery block to compensate for wear, &c. The rack and pinion and the hand-wheel 72 provide means for moving the slide 66 longitudinally along the tool-cylinder to any desired position. When not in use, the attachment is swung backwardly out of use into the position indicated in dotted lines in the drawings.

As intimated above, I do not wish to confine myself to the particular construction and arrangement of parts herein shown and described, since various modifications and changes might be made without departing from the spirit and scope of my invention.

Having thus described my invention, what I claim as new, and desire to secure by Letters Patent, is—

1. In a hide and leather working machine, the combination with a rotary, reciprocating winding-drum of comparatively large diameter, its work-holding clamp, and operating mechanism, and with a tool-cylinder above said drum, of an intermediate cylinder between said drum and tool-cylinder, and means for rotating said intermediate cylinder reversely to the rotation of the drum and tool-cylinder, substantially as specified.

2. A hide and leather working machine having a rapidly-rotating tool-cylinder, a slowly-rotating winding-drum, and an intermediate table-cylinder, together with mechanism whereby said table-cylinder is rotated reversely to the drum and to the tool-cylinder, and at a slow rate of speed, substantially as specified.

3. In a hide and leather working machine, the combination with the large winding-drum, and its rotating, adjusting and reversing mechanisms, of a table-cylinder above said drum and having a rotary and an oscillatory movement, and a tool-cylinder which coacts with said table-cylinder, substantially as specified.

4. In a hide and leather working machine, the combination with the large rotary, reciprocatory winding-drum, having an automatic work-holding clamp, and the rotary tool-cylinder above said drum, of arms loosely mounted on the shaft of said drum and capable of rotating both with and on said shaft, a cylinder journaled in said arms and situated intermediately of the drum and the tool-cylinder, stops for limiting the movement of the said arms, and gear for rotating said cylinder, substantially as specified.

5. In a hide and leather working machine, the combination with the large rotary reciprocatory winding-drum, its rotating and reversing mechanism and automatic work-clamp, and with a rotary tool-cylinder journaled above said drum, of counterweighted arms journaled to swing on the drum-shaft, and having frictional devices whereby they rotate with said shaft in one direction, stops for limiting the movement of the said arms, a cylinder carried thereby, and gear between the cylinder-shaft and the drum-shaft, substantially as specified.

6. In a hide and leather working machine, the combination with the main frame, and with the tool-cylinder journaled at the upper portion of the same, said frame having lugs 64 behind said cylinder, of arms 63 pivotally connected to said lugs, a slotted frame carried by said arms, a carriage adapted to move longitudinally in said frame, and provided with a grinding or sharpening device, means for operating said carriage, means for securing said frame in operative relation to said tool-cylinder, and stops which coact with extensions of said arms 63 to support said frame when swung upwardly and backwardly out of operative position, substantially as specified.

In testimony whereof I affix my signature in presence of two witnesses.

GEORGE W. BAKER.

Witnesses:
MAURICE P. SATTERTHWAITE,
WILBUR L. SASSE.